United States Patent [19]

Telkes

[11] 4,250,866
[45] Feb. 17, 1981

[54] THERMAL ENERGY STORAGE TO INCREASE FURNACE EFFICIENCY

[75] Inventor: Maria Telkes, Killeen, Tex.

[73] Assignee: Research Institute for Advanced Technology, Killeen, Tex.

[21] Appl. No.: 73,914

[22] Filed: Sep. 10, 1979

[51] Int. Cl.³ .................. F24H 3/00; F23M 9/00; F23L 15/02

[52] U.S. Cl. .............. 126/116 A; 110/101 C; 110/323; 110/324; 126/110 A; 126/400; 165/4; 165/10; 165/35; 165/39; 237/75

[58] Field of Search ............... 126/400, 116 A, 263, 126/110 A, 108; 237/44, 75; 165/35, 4, 39, 10; 110/322, 323, 324, 325, 101 C, 101 CA

[56] References Cited

U.S. PATENT DOCUMENTS

| 1,538,686 | 5/1925 | Chamberlain | 165/4 |
|---|---|---|---|
| 1,781,303 | 11/1930 | Rydmark | 165/4 |
| 2,419,710 | 4/1947 | DiFilippo | 110/322 |
| 3,920,066 | 11/1975 | Kirchhoff | 165/4 |
| 3,941,185 | 3/1976 | Henning | 165/4 |
| 3,946,801 | 3/1976 | Brunnell et al. | 126/116 A |
| 4,080,784 | 3/1978 | Jubb | 110/101 CA |
| 4,088,183 | 5/1978 | Anzali et al. | 126/400 |
| 4,094,302 | 6/1978 | Rohr | 110/322 |

Primary Examiner—James C. Yeung
Assistant Examiner—Daniel O'Connor
Attorney, Agent, or Firm—Peter J. Murphy

[57] ABSTRACT

A forced air furnace includes a conventional fuel fired, primary heat exchanger and a secondary heat exchanger associated with the stack. The secondary exchanger includes a phase change material having a transition temperature within the range of the stack temperature, and which is disposed in heat exchange relation with the flue gases flowing through the stack. The secondary exchanger also includes duct means for conveying the circulated air in heat exchange relation with the phase change material; and the flow path through the secondary exchanger is an alternative path controlled by a damper. When the primary exchanger is turned on, the phase change material in the secondary exchanger is charged from the flue gases of the primary exchanger. When the phase change material is in condition to release stored heat, a temperature responsive control shuts off the primary exchanger and diverts the circulated air through the secondary exchanger.

8 Claims, 6 Drawing Figures

THERMAL ENERGY STORAGE TO INCREASE FURNACE EFFICIENCY

BACKGROUND AND SUMMARY OF THE INVENTION

This invention relates to air heating furnace systems having means to store, and subsequently release, heat from the flue gas which would otherwise be merely dissipated through the stack; and more particularly to a heat storage exchange unit for association with the flue gas stack of such furnace systems.

Much thought has been given to increase in the efficiency of furnaces for the heating of building space, particularly furnaces which are heated by oil or gas, by utilizing the heat of the flue gases which is otherwise lost.

This invention is concerned with a forced air heating furnace, wherein the fuel is a flowable fuel the flow of which may be controlled, including a primary heat exchanger wherein heat of the burning fuel is transferred to the circulated air, and a recuperator exchanger for storing heat removed from the flue gas and later transferring the stored heat to the circulated air, with the two heat exchangers being operated alternatively to heat the circulated air as required.

More specifically, this invention is concerned with the use of a phase change heat storage material in the recuperator exchanger, to enable the maximum transfer of heat from the flue gas to the storage material and the maximum transfer of heat from the storage material to the circulated air.

A primary object of this invention is to provide a heating furnace system which will operate at much higher efficiency than conventional heating furnace systems.

Another object of this invention is to provide an auxiliary system which may be added to an existing heating furnace system, without major change in the existing system, to produce a much more efficient overall furnace system.

Another object of this invention is to provide a heating furnace system including a second recuperator exchanger in association with the flue gas stack, wherein a phase change material is used as a heat storage and heat recovery medium.

Still another object of this invention is to provide a heating furnace system, utilizing a recuperator exchanger associated with the stack of the furnace system, and which is much more efficient and effective than known systems utilizing a second heat exchanger associated with a furnace stack.

A still further object of this invention is to provide a novel heat recuperator exchanger for association with the flue gas stack of a furnace system to produce a much more efficient furnace system.

These objects are accomplished in a forced air heating system comprising the following components:

A furnace includes a combustion chamber for burning a flowable fuel as a source of heat, means for controlling the flow of fuel to the combustion chamber, inlet duct means and discharge duct means for the circulated air flowing through the furnace, a primary heat exchanger for the circulated air associated with the combustion chamber, and a stack for discharging flue gas from the primary heat exchanger. A blower effects the flow of circulated air through the furnace and through the space to be heated. A recuperator exchanger comprises a body of a phase change material, disposed in heat exchange relation with the flue gases flowing through the stack, and means for conveying the circulated air in heat exchange relation with the heat exchange body. Duct means connect the recuperator exchanger between the inlet duct means and the outlet duct means. A bypass duct means is connected between the inlet duct means, for bypassing the recuperator exchanger. A gate means effects the flow of circulated air alternatively through the recuperator exchanger and the bypass duct means. An actuator means is responsive to the temperature of the phase change material, for controlling the fuel flow control means and for controlling the gate means.

The novel features and the advantages of the invention, as well as additional objects thereof, will be understood more fully from the following description when read in connection with the accompanying drawing.

DRAWINGS

DESCRIPTION OF THE PREFERRED EMBODIMENTS

Figure 1:
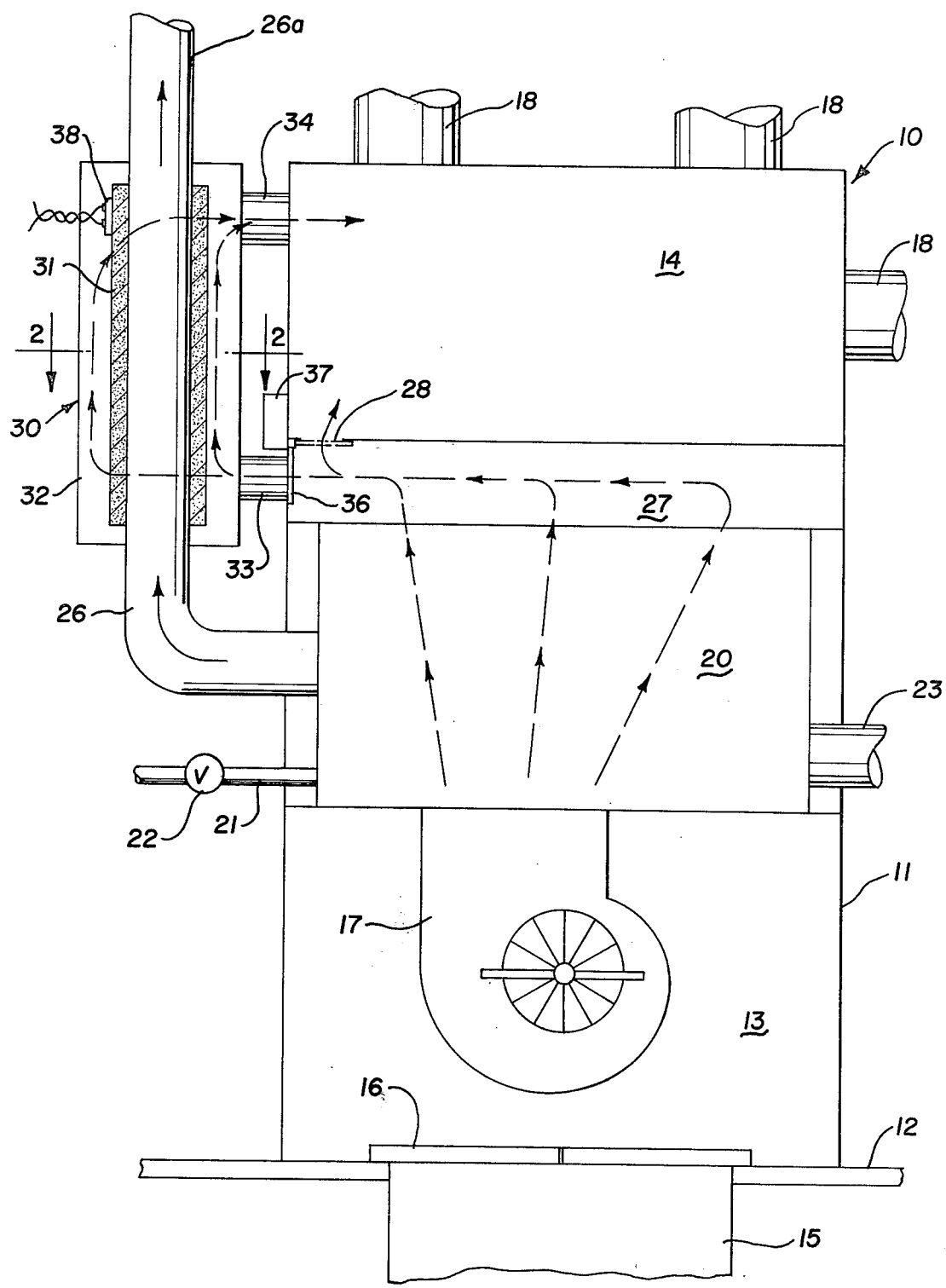
FIG. 1 is a diagrammatic view of a gas fired furnace for a home, for example, embodying the invention.

The furnace system illustrated in FIG. 1, and described below, is based on a typical gas fired furnace which might be used as the central heating unit of a home, or for other heating applications. It is to be understood, however, that this illustrated and described furnace system, in which the primary heat exchanger is a gas fired unit, is only representative of conventional heating units which utilize a flowable fuel such as natural or synthetic gas, fuel oil or other liquid fuel, or a flowable fuel such as pulverized coal. For the functioning of the overall furnace system according to the invention, it is necessary that the fuel supplied to the primary heat exchanger be turned off and on during the operation of the system.

In a conventional gas fired furnace, the temperature of the flue gas may be as high as 400° F.; and this represents a significant loss of heat which is merely dissipated through the stack. In a conventional oil fired furnace, the temperature of the flue gas may be as high as 700° F., resulting in a more significant loss. The magnitude of wasted energy may be realized when it is considered that there are approximately twenty million homes in the United States heated by oil fired furnaces, and ten million homes heated by gas furnaces.

In considering the recovery of otherwise wasted heat energy from flue gases, some modifying factors must be considered. One factor is that flue gases contain vaporized water and sulfur dioxide. When the flue gas temperature goes below 212° F., the condensation temperature of water, sulfuric acid (H2S04) may be formed which is, of course, very corrosive to metallic parts of the system. One solution to this problem is either to coat the sensitive parts with noncorrosive coatings such as silicone or ceramic, or to fabricate those sensitive parts from a noncorrosive material such as ceramic. Another solution to this problem is to maintain the flue gas temperature above 212° F. so that the water vapor will be discharged to the atmosphere in vapor form.

Another problem which results from excessive reduction of the flue gas temperature is that the chimney effect of the flue may be destroyed. This problem is also solved by maintaining a minimum level of flue gas temperature.

A solution to the stack heat loss problem is to incorporate, in the furnace system, a recuperator exchanger associated with the stack and which employs a "phase change material" as the medium for receiving and storing the energy from the flue gas, and later releasing this heat energy to the circulated air to be heated by the furnace system. These phase change materials are characterized by the absorbing and releasing of significant amounts of heat energy during transition from one phase to another, resulting from temperature increase or decrease respectively. The change in phase may be from a solid phase to a liquid phase (heat of fusion) or may be a transition from one form of solid phase to another form of solid phase. The temperature at which the change in phase occurs is referred to hereafter as the "transition temperature"; and this may be a temperature range rather than a well defined temperature level. The heat which is stored and subsequently released by the phase change material includes not only the heat energy resulting from the phase change, but also the latent heat of the particular material.

Referring now to FIG. 1, a furnace system according to the invention includes a typical gas fired furnace 10, including an outer housing or casing 11 enclosing the several furnace components. The illustrated furnace 10 is an upright unit adapted to stand on the floor 12 of a structure, and having an inlet chamber 13 at the bottom and a discharge chamber or plenum 14 at the top. At the base of the furnace the inlet chamber communicates with return air plenum 15 under the floor structure 12; and the furnace may include mountings for filters 16 which filter the return air as it passes from the plenum 15 to the chamber 13. A blower 17, mounted in the inlet chamber, forces the circulating air from the inlet chamber through the furnace to the discharge plenum 14, and circulates the air through the building structure to be heated. Outlet ducts 18 carry the heated air from the discharge plenum 14 to the several parts of the building structure.

The primary heat exchanger 20 includes a combustion chamber having mounted therein one or more gas burners, for example, supplied by a conduit 21 and control valve 22. Combustion air is supplied to the combustion chamber through an inlet conduit 23. The heat exchanger 20 may include flues for carrying heated flue gas in heat exchange relation with circulated air, and eventually to the discharge stack 26, and ducts or other flow path structure for conveying the circulated air from the blower 17 to a collection chamber 27 disposed between the primary heat exchanger and the discharge plenum 14. In the illustrated furnace, the collection chamber 27 communicates with the discharge plenum 14 through a bypass duct indicated by an opening 28; and the air flow through this bypass passage is controlled by a two position gate 36 to be described subsequently.

The recuperator exchanger 30 includes a heat storage unit 31 in the form of a conduit which may be incorporated as a segment of the discharge stack 26, between the lower portion of the stack and an upper portion 26a. The storage unit 31 and the immediately adjacent portions of the stack 26, 26a are enclosed by a duct jacket 32 which conveys the circulated air in heat exchange relation with the exterior of the unit 31, and which is connected in sealed relation with the stack portions 26 and 26a. While the unit 31 may preferably form a segment of the flue gas stack, alternatively it may simply be mounted to closely surround an existing sheet metal stack in close heat exchange relation.

The lower end of the duct jacket 32 is connected to the collection chamber 27 by means of a duct 33; and its upper end is connected to the discharge plenum 14 by a duct 34. The two position gate 36, referred to above, is mounted in the furnace to close the duct 33 and open the bypass duct 28 in one position, and in the alternative position to open the duct 33 and close the bypass duct 28. This gate may be operated by an actuator 37 mounted at the exterior of the furnace housing 11, for example; and the actuator is controlled by a temperature responsive signaling device 38 mounted in association with the heat exchange unit 31 at its upper end. The upper end of the heat exchange unit will normally be the cooler end since the heating flue gases are flowing upward, and the circulated air which withdraws the heat from the unit is also flowing upward.

Figure 2:
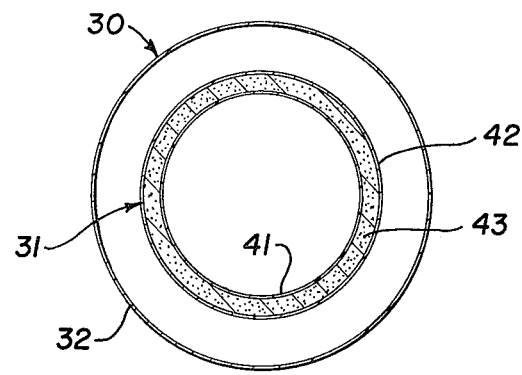
FIG. 2 is a transverse sectional view of the recuperator exchanger taken along the line 2—2 of FIG. 1.

The particular form of storage unit 31 illustrated in FIGS. 1 and 2 is that of a cylindrical duct, fabricated from sheet metal for example, to form a double walled conduit providing a sealed annular chamber. A suitable phase change material, examples of which are described below, is contained within this annular chamber. FIG. 2 more particularly illustrates the duct storage unit which includes an inner wall 41, an outer wall 42 containing the phase change material 43.

Figure 3:
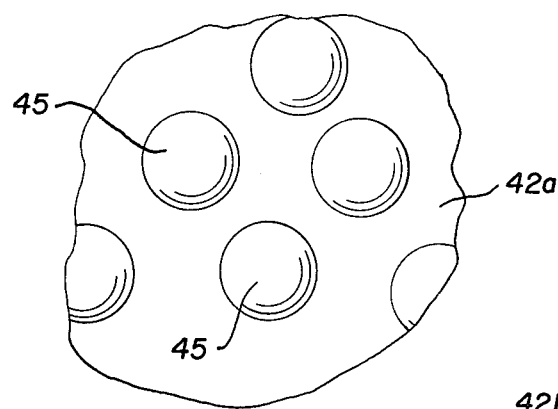
FIGS. 3 and 4 are fragmentary views of alternative forms of wall configurations for a recuperator exchanger.

It may be desirable that the wall surfaces of the storage unit be provided with surface irregularities for the purposes of (1) increasing the heat transfer surface area, and (2) directing the flow of the passing gases or air into better heat exchange relation with the wall surfaces. FIG. 3 is a fragmentary view of a portion of an outer wall 42a for example, which includes dimples 45 projecting from the principal wall surface.

Figure 4:
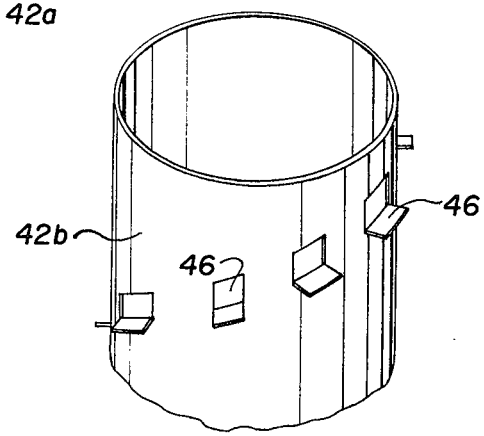

FIG. 4 is a fragmentary view of an outer wall section 42b for a heat exchange unit, which includes sheet metal projections 46 secured to the wall portion 42b by spot welding, for example. The projections 46 may be secured to the sheet metal prior to the formation of the sheet metal into a cylindrical casing; and a similar prefabricated sheet metal may be used for both the exterior and interior casings or walls 41b and 42b for a heat exchange unit.

Figure 5:
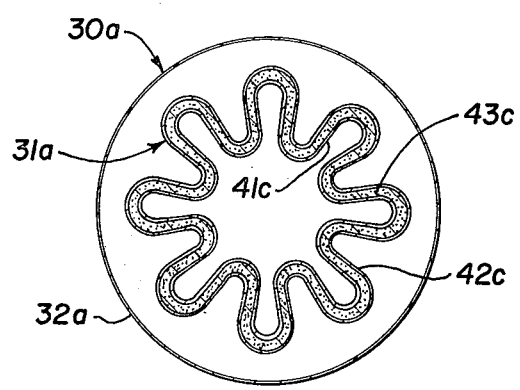
FIG. 5 is a transverse sectional view of another form of recuperator exchanger.

The cross-sectional configuration for the storage unit may be other than round; and FIG. 5 illustrates a unit which is generally star-shaped in cross-section, thereby providing a much greater surface contact area for both the interior wall 41c and the exterior wall 42c. Here again, both the interior and exterior walls may be provided with surface irregularities or surface projections.

Other means, such as baffles, may be provided both within the stack segment 31 and within the duct jacket 32 to maximize gas or air contact with the storage unit wall surfaces.

Figure 6:
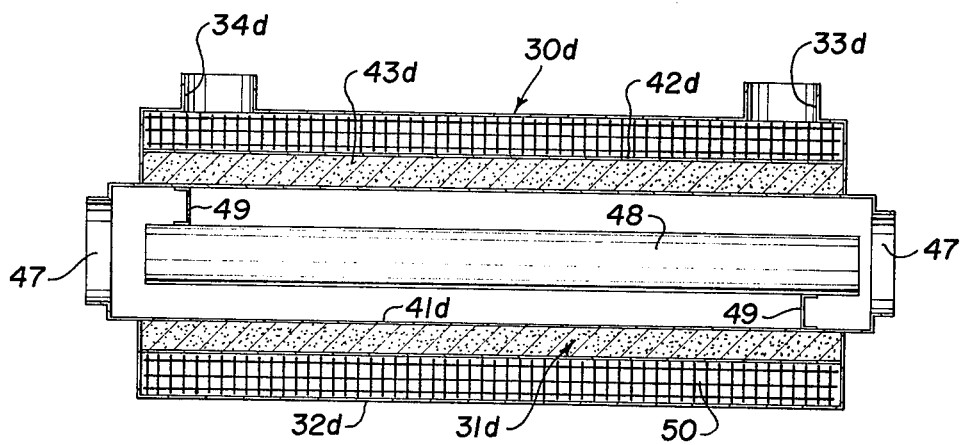
FIG. 6 is a longitudinal sectional view of still another alternative form of recuperator exchanger according to the invention.

FIG. 6 is a longitudinal sectional view of an alternative form of recuperator exchanger 30d adapted to be connected into the furnace stack 26. In this unit the inner cylindrical wall 41d forms a radially enlarged flow chamber for the flue gas, having reduced diameter flue connectors 47 at either end for connection to the flue sections 26 and 26a. An elongated core plug 48 is supported within this chamber by suitable brackets 49 to define an elongated annular flow chamber, this annular chamber being provided for better heat exchange relation of the flue gas with the wall 41d. The core plug may be fabricated of any material and have any construction suitable to withstand the extant temperatures and to occupy the core space to provide the annular flow chamber for the flue gas. The heat exchange unit 31d again comprises a body of a heat exchange material 43d, which is confined between cylindrical inner and outer walls 41d and 42d. The outer wall 42d and the cylindrical duct jacket wall 32d form the annular chamber for the flow of circulated air from one end toward the other through the ducts 33d and 34d. This annular chamber for the circulated air is filled with a "wire mesh baffle" 50 which may have several forms. One preferred form of wire mesh baffle 50 consists of a mass of loosely crunched aluminum wire which substantially fills the annular chamber. This wire mesh baffle may perform two basic functions, namely: (1) that of a baffle to slow down the flow of air passing through the chamber, and (2) that of a surface extender, in the sense that the aluminum wire baffle is in contact with the outer wall 42d of the heat exchange unit 31d and therefore improves the transfer of heat from that unit to the circulating air. This wire mesh baffle 50 may have other forms, such as: (1) lightly crunched aluminum wire screen, or (2) lightly crunched metallic hardware cloth, for example.

GAS FURNACE EXAMPLE

Making assumptions that an average furnace consumes fuel at a rate of 60,000 BTU per hour and has an efficiency of about 55%, about 33,000 BTU per hour is delivered to the space to be heated, 45% of the heat being lost through the stack. The efficiency of such unit may be increased to 85% by storing 20,000 BTU per hour of heat in a recuperator exchanger as above described. If it is further assumed that the "heat storage-heat release cycle" of the storage unit 31 is about 15 minutes ($\frac{1}{4}$ hour), then, if that unit has the capacity to store and release 5,000 BTU during one such cycle, the above mentioned storage capacity of 20,000 BTU per hour will be attained.

The phase change material for the thermal storage unit 31 may be selected from a group of salt-hydrates that melt in their water of crystallization at a high enough temperature level, and have boiling points at an elevated temperature. A typical example is magnesium chloride hexahydrate ($MgCl_2 6H_2O$). This material melts at 241° F. and completely dissolves at 243° F. in its water of hydration; therefore the transition temperature is about 242° F. The boiling point of this saturated solution is 318° F. This material, then, is suitable for use in a gas furnace application wherein the material may be cycled, for example, between a low temperature of 100° F., and a high temperature of 300° F. Considering the specific heat of the material in both solid and liquid phases, and the heat of fusion at the transition temperature, and also considering the density of the material and the above mentioned temperature range, it can be calculated that about 0.31 cubic feet of this material would be required for a storage capacity of 5,000 BTU.

The magnesium chloride hexahydrate is available in practically unlimited quantities, derived from sea water; and its price is reasonable.

OIL FURNACE EXAMPLE

A phase change material suitable for use in an oil furnace system is anhydrous sodium sulfate ($Na_2SO_4$), which has a solid-to-solid transition temperature around 450° F. As mentioned, the flue gas temperature for an oil furnace may be as high as 700° F.

For this example it is again assumed that the average furnace rated at 60,000 BTU per hour (gross fuel consumption) may require the storage of 20,000 BTU per hour to improve significantly the efficiency of the combustion process. It is again assumed that the heat storage-heat release cycle of the storage unit will be about fifteen minutes; and accordingly the storage requirement for the storage unit is again 5,000 BTU.

Assuming a cycling temperature range for the storage unit 31 between 200° F. and 600° F., it can be computed that 41 pounds of compacted powdered sodium sulfate, having a volume of about 0.33 cubic feet would be sufficient to store 5,000 BTU. For this amount of material, it may be visualized that the storage unit 31 is a convoluted insert, replacing about 2 to 4 feet of length of the furnace stack, and which would house a one-half inch to one inch thick layer of the compacted sodium sulfate powder. The circumference of such unit 31 should be about 2 feet and the flue section therefore may be about 8 inches in diameter.

With the star-shaped design of FIG. 3, the surface area of the unit might be increased from 4 square feet to 8 square feet and the thinner layer of about $\frac{1}{2}$ inch of sodium sulfate might be used.

For improved heat storage and dispensing capability of a storage unit 31, such unit may desirably be fabricated in two sections to include two different phase change materials which will have transition temperatures at different temperature levels but within, of course, the temperature range limits of the storage unit. The efficiency would be improved by taking advantage of the heat of fusion and/or heat of transition for two different materials.

One section, for example, may include the above described magnesium chloride hexahydrate, and the other section may include the above described anhydrous sodium sulfate.

OPERATION

The general operation of the system described with reference to FIG. 1 will now be described. When the system originally calls for heat, through the usual thermostat provided in the space to be heated, the gas valve 22 will be opened and simultaneously the gas flowing to the furnace will be ignited to heat the primary heat exchanger 20. The blower 17 will be activated (assuming it is not running continuously) to circulate air through the system, when the collector chamber temperature in the plenum 14 reaches a selected minimum. The storage unit 31 will initially be at low temperature and, through the sensor 38, the actuator 36 will position the gate 36 in the illustrated position closing off the duct 33 and opening the bypass duct 28. Heated air from the primary heat exchanger 20 will then flow through the collector chamber 27, bypass duct 28, and plenum 14 to the outlet ducts 18.

Should the room thermostat stop calling for heat before the storage unit reaches its selected maximum temperature, the gas valve will be turned off and the air will continue to circulate through the same path when the blower is running. When the thermostat again calls for heat, the gas valve will again be opened and the primary heat exchanger activated, and the storage unit 31 will be heated further by the flue gases.

When the upper selected maximum temperature of the storage unit is reached, the actuator 37 will shift the gate 36 to the indicated phantom line position, to close off the bypass duct 28 and open the duct 33. The air will then be circulated from the collection chamber 27 through the secondary heat exchanger duct jacket 32 to the plenum 14, and will be heated by the storage unit 31.

Should the room thermostat stop calling for heat, the blower 17 will be shut off and the remaining heat stored in the unit 31 will be retained therein. When the room thermostat again calls for heat, the blower will be turned on again to circulate air through the jacket 32. If, during this time, the temperature of the storage unit decreases to the lower limit, the actuator 37 responding to the sensor 38 will again shift the damper 36 to the solid line position, and will effect the opening of the gas valve 22 and ignition of the gas burners to resume heating of the circulated air by the primary heat exchanger.

The above described heat storage—heat release cycle will be repeated as necessary in accordance with the demands of the room thermostat.

What has been described is a novel heating furnace system for providing greatly improved efficiency and, therefore, significant conservation of heating fuel. A particular feature and advantage of the invention is the utilization of a form of accumulator exchanger, in association with the flue gas stack, which is very effective and which may be fabricated at reasonable cost. A factor with respect to the cost is that some of the phase change materials suitable for use in the described accumulator exchanger are available in quantity and at low cost. A factor in the efficiency of the overall unit is that the accumulator exchanger utilizes the heat from the furnace flue gases which would otherwise be lost, and utilizes this heat in a most efficient way to obtain maximum heat withdrawal from the flue gases, storage of such heat, and later transfer of such heat to the circulated air.

A particular feature of the accumulator exchanger, according to the invention, is that units may be designed for ready adaptation or retrofitting to existing furnaces; and this is facilitated by the simplicity of the controls required to produce an operational system. Because of the simplicity of the accumulator exchanger units, installation costs should be low; and the combined low fabrication cost and installation cost should enable many homeowners to install such retrofitted systems, and to recover their costs in a relatively short time through the savings in fuel costs.

While preferred embodiments of the invention have been illustrated and described, it will be understood by those skilled in the art that changes and modifications may be resorted to without departing from the spirit and scope of the invention. While a gas fired furnace system has been described, it will be apparent that the invention may be readily adapted for use with oil fired furnaces, as well as for other furnace systems involving the use of a fuel in which the fuel flow is controlled and fed to the combustion chamber for intermittent operation of the primary heat exchanger. The invention, then, may be utilized in furnaces burning a pulverized solid fuel such as coal, for example.

What is claimed is
1. A forced air heating system including:
a furnace comprising a combustion chamber for burning a flowable fuel as a source of heat, means for controlling the flow of fuel to said combustion chamber, inlet duct means and discharge means for the circulated air flowing through said furnace, and a primary heat exchanger associated with said combustion chamber for heating the circulated air; a stack for discharging flue gases from said primary heat exchanger; and a blower for effecting the flow of circulated air through said furnace and the space to be heated; wherein the improvement comprises:
a recuperator exchanger comprising a body of a phase change material, disposed in heat exchange relation with the flue gases flowing through said stack, and flow path means for conveying the circulated air in heat exchange relation with said body; duct means connecting said recuperator exchanger between said inlet duct means and said discharge duct means;
bypass duct means connected between said inlet duct means and said discharge duct means, for bypassing said recuperator exchanger;
gate means for effecting the flow of circulated air alternatively through said recuperator exchanger and said bypass duct means;
and actuator means, responsive to the temperature of said phase change material, for controlling said fuel flow control means and said gate means.
2. A system as set forth in claim 1
said recuperator exchanger and said bypass duct means providing alternative flow paths connecting said primary exchanger and said discharge duct means.
3. A system as set forth in claim 1
said recuperator exchanger comprising a body of magnesium chloride hexahydrate, having a transition temperature of about 240° F.
4. A system as set forth in claim 1
said recuperator exchanger comprising a body of anhydrous sodium sulfate, having a transition temperature of about 460° F.
5. A system as set forth in claim 1
said recuperator exchanger including a plurality of heat exchange units, each unit comprising a body of a phase change material, with the transition temperatures of said plurality of units differing from each other within a selected range of temperatures.
6. A system as set forth in claim 5
one of said heat exchange units comprising a body of magnesium chloride hexahydrate having a transition temperature of about 240° F.; and another of said heat exchange units comprising a body of anhydrous sodium sulfate having a transition temperature of about 460° F.
7. A system as set forth in claim 1
said recuperator exchanger comprising a segment of said stack, fabricated from said body of a phase change material; and said flow path means of said recuperator exchanger including jacket means surrounding said stack segment.
8. A system as set forth in claim 7
said stack segment comprising an elongated double walled duct fabricated from sheet metal, closed at its ends, to define a sealed chamber enclosing said body of a phase change material.

* * * * *